(12) United States Patent
Benkert et al.

(10) Patent No.: US 10,402,835 B2
(45) Date of Patent: Sep. 3, 2019

(54) AGRICULTURAL SITUATIONAL AWARENESS TOOL

(71) Applicant: RAYTHEON COMPANY, Waltham, MA (US)

(72) Inventors: John G. Benkert, Woburn, MA (US); William J. Kyker, Sterling, VA (US); Michael P. Sica, Sterling, VA (US); Jason Dudash, Sterling, VA (US); Joseph L. Shivers, Garland, TX (US); Justin W. Ray, Indianapolis, IN (US)

(73) Assignee: RAYTHEON COMPANY, Waltham, MA (US)

( * ) Notice: Subject to any disclaimer, the term of this patent is extended or adjusted under 35 U.S.C. 154(b) by 206 days.

(21) Appl. No.: 14/801,204

(22) Filed: Jul. 16, 2015

(65) Prior Publication Data

US 2016/0019560 A1 Jan. 21, 2016

Related U.S. Application Data

(60) Provisional application No. 62/025,456, filed on Jul. 16, 2014.

(51) Int. Cl.
*G06Q 30/02* (2012.01)
*G06Q 10/06* (2012.01)
*G06Q 10/00* (2012.01)

(52) U.S. Cl.
CPC ......... *G06Q 30/0201* (2013.01); *G06Q 10/00* (2013.01); *G06Q 10/06311* (2013.01); *G06Q 10/063114* (2013.01); *G06Q 30/02* (2013.01)

(58) Field of Classification Search
CPC ...... G06Q 10/00; G06Q 10/063; G06Q 50/02; G06Q 10/10; G06Q 50/26; G06Q 50/265; G06Q 10/04; G06Q 40/12; G06Q 10/06; G06Q 10/087; G06Q 10/0635; G06Q 10/08; G06Q 30/02; G06Q 30/0201; G06Q 30/0205; G06Q 30/0218; H04W 4/02; H04W 4/006; H04W 4/028; H04W 4/021; G01C 21/00; G01C 21/32; G01C 21/34;
(Continued)

(56) References Cited

U.S. PATENT DOCUMENTS 5,870,689 A * 2/1999 Hale ................. A01B 79/005
702/5
5,898,792 A * 4/1999 Oste ..................... G01N 33/10
382/110

(Continued)

*Primary Examiner* — Dhairya A Patel
*Assistant Examiner* — Clifton Houston
(74) *Attorney, Agent, or Firm* — Lewis Roca Rothgerber Christie LLP

(57) ABSTRACT

A system for collecting and analyzing agricultural data. A team of crop scouts performs a scouting operation in a farm, each crop scout interacting with a mobile device. The mobile device provides a navigation display guiding the scout along a route, from one data collection point to the next. At each data collection point, the crop scout makes observations and measurements and inputs the corresponding data into the mobile device. A control operator at a central location monitors the progress of the scouting operation and revises the routes or locations of data collection points when appropriate, based on data received during the scouting operation. A cloud service analyzes the data and provides recommendations to a farm operator.

17 Claims, 7 Drawing Sheets

(58) Field of Classification Search
CPC ............... G01C 21/3407; G01C 21/165; G01C 21/206; G01C 21/30; G01C 21/3461; G01C 21/3476; G01C 21/3484
See application file for complete search history.

(56) References Cited

U.S. PATENT DOCUMENTS

| | | | | |
|---|---|---|---|---|
| 5,991,687 A * | 11/1999 | Hale | A01B 79/005 | 342/357.31 |
| 6,064,943 A * | 5/2000 | Clark, Jr. | G06F 3/033 | 702/2 |
| 6,070,673 A * | 6/2000 | Wendte | G01C 21/20 | 172/2 |
| 6,597,991 B1 * | 7/2003 | Meron | A01G 25/167 | 382/110 |
| 6,597,992 B2 * | 7/2003 | Rooney | G01V 11/00 | 700/283 |
| 7,035,650 B1 * | 4/2006 | Moskowitz | G01S 5/0247 | 340/995.23 |
| 8,412,183 B1 * | 4/2013 | Kadous | G01C 21/206 | 455/423 |
| 8,479,221 B2 * | 7/2013 | Macy | G06F 9/542 | 719/318 |
| 2004/0027000 A1 * | 2/2004 | Beeren | A01B 63/00 | 307/10.1 |
| 2004/0034684 A1 * | 2/2004 | Payne | G06Q 10/10 | 709/201 |
| 2004/0140902 A1 * | 7/2004 | Staples | A01G 25/167 | 340/602 |
| 2004/0225436 A1 * | 11/2004 | Yoshihashi | G01C 21/20 | 701/532 |
| 2005/0283314 A1 * | 12/2005 | Hall | A01C 21/007 | 702/2 |
| 2006/0116818 A1 * | 6/2006 | Chao | G01C 21/3415 | 701/431 |
| 2007/0088897 A1 * | 4/2007 | Wailes | G01C 21/343 | 711/3 |
| 2008/0077642 A1 * | 3/2008 | Carbone | G06F 16/9537 | 709/203 |
| 2008/0087177 A1 * | 4/2008 | Olander | A01F 15/0833 | 100/5 |
| 2008/0258078 A1 * | 10/2008 | VerMeulen | A01G 7/00 | 250/474.1 |
| 2009/0307474 A1 * | 12/2009 | Johnston | G06F 21/572 | 713/2 |
| 2011/0135197 A1 * | 6/2011 | Paris | G06T 7/00 | 382/165 |
| 2011/0190948 A1 * | 8/2011 | Fekete | G05B 15/02 | 700/284 |
| 2011/0231217 A1 * | 9/2011 | Hand | G06Q 10/047 | 705/7.12 |
| 2011/0295500 A1 * | 12/2011 | Hunt | G06Q 10/00 | 701/408 |
| 2012/0083907 A1 * | 4/2012 | Motavalli | G06Q 10/0631 | 700/90 |
| 2012/0101861 A1 * | 4/2012 | Lindores | G06Q 10/06 | 705/7.11 |
| 2012/0109520 A1 * | 5/2012 | Hood | A01B 79/005 | 701/468 |
| 2012/0123817 A1 * | 5/2012 | Hohenberger | G06Q 10/0631 | 705/7.12 |
| 2012/0215446 A1 * | 8/2012 | Schunder | G07C 5/008 | 702/3 |
| 2012/0237083 A1 * | 9/2012 | Lange | G06K 9/00805 | 382/103 |
| 2012/0260618 A1 * | 10/2012 | Alley | A01D 45/02 | 56/14.7 |
| 2013/0091452 A1 * | 4/2013 | Sorden | G06F 3/048 | 715/771 |
| 2013/0104232 A1 * | 4/2013 | Johnson | H04W 12/12 | 726/23 |
| 2013/0155245 A1 * | 6/2013 | Slamka | G09B 5/14 | 348/158 |
| 2013/0211628 A1 * | 8/2013 | Thurow | G06F 17/00 | 701/2 |
| 2014/0023243 A1 * | 1/2014 | Nagaraj | G06K 9/00624 | 382/110 |
| 2014/0035752 A1 * | 2/2014 | Johnson | A01G 22/00 | 340/601 |
| 2014/0058881 A1 * | 2/2014 | Rosenbaum | G06Q 50/02 | 705/26.7 |
| 2014/0168412 A1 * | 6/2014 | Shulman | H04N 7/18 | 348/89 |
| 2014/0258326 A1 * | 9/2014 | Iyer | G06Q 10/06395 | 707/769 |
| 2014/0312165 A1 * | 10/2014 | Mkrtchyan | B64D 47/08 | 244/13 |
| 2014/0379317 A1 * | 12/2014 | Sanden | E21B 43/00 | 703/10 |
| 2015/0057817 A1 * | 2/2015 | Endrizzi | A01G 25/165 | 700/284 |
| 2015/0081116 A1 * | 3/2015 | Endrizzi | A01G 25/165 | 700/284 |
| 2015/0187109 A1 * | 7/2015 | Mentzer | G06T 11/00 | 345/632 |
| 2015/0278838 A1 * | 10/2015 | Rasa | G06Q 30/0205 | 705/7.34 |
| 2016/0225135 A1 * | 8/2016 | Young | G06T 7/11 | |
| 2017/0024876 A1 * | 1/2017 | Young | G06T 7/0004 | |

* cited by examiner

AGRICULTURAL SITUATIONAL AWARENESS TOOL

CROSS-REFERENCE TO RELATED APPLICATION(S)

The present application claims priority to and the benefit of U.S. Provisional Application No. 62/025,456, filed Jul. 16, 2014, entitled "AGRICULTURAL SITUATIONAL AWARENESS TOOL", the entire content of which is incorporated herein by reference.

BACKGROUND

1. Field

One or more aspects of embodiments according to the present invention relate to agricultural data gathering and planning, and more particularly to a tool for providing agricultural situational awareness.

2. Description of Related Art

In agriculture a farm operator may make a variety of decisions to improve crop yields, or to maximize profits. For example, the operator may set irrigation schedules or "prescriptions", pesticide and fertilizer application prescriptions, and harvesting schedules. Each such decision may be more reliably made if informed by data about past, current, and predicted weather, current crop health, soil conditions, and the like.

An operator may obtain farm data from crop scouts, who may visit parts of the farm and make and record observations as to local crop and environmental conditions. If such a scout takes notes while surveying the farm, and returns to a central location to report to the operator, it may occur that a follow-up survey is required, to determine, for example the cause of an unexpected change in crop health, of which the scout, lacking information about past crop health, was unaware during the scouting operation. Such a process is inefficient. Thus, there is a need for a system and method for efficient gathering of agricultural data.

SUMMARY

Aspects of embodiments of the present disclosure are directed toward a system for collecting and analyzing agricultural data. A team of crop scouts performs a scouting operation in a farm, each crop scout interacting with a mobile device. The mobile device provides a navigation display guiding the scout along a route, from one data collection point to the next. At each data collection point, the crop scout makes observations and measurements and inputs the corresponding data into the mobile device. A control operator at a central location monitors the progress of the scouting operation and revises the routes or locations of data collection points when appropriate, based on data received during the scouting operation. A cloud service analyzes the data and provides recommendations to a farm operator.

According to an embodiment of the present invention there is provided a system for collecting crop data and environmental data from a field, the system including: a plurality of mobile devices configured to be deployed to the field; and a central controller; the mobile devices being configured to be connected to each other and to the central controller, while in the field, by wireless data connections; each mobile device being configured: to display a current device location; to store and display a current scouting path; and to receive, in the field, from the central controller, a revised scouting path, and to substitute the revised scouting path for the stored current scouting path; the mobile device further being configured to receive, while in the field, input including current crop data or current environmental data, and to send, while in the field, to the central controller, the current crop data or current environmental data.

In one embodiment, the central controller is configured to provide to a mobile device of the plurality of mobile devices, upon request from the mobile device, while the mobile device is in the field, historical crop data or environmental data.

In one embodiment, the central controller is configured to receive a data request from the mobile device, the data request including a range of dates, and provide to the mobile device temporally filtered data, the temporally filtered data including only data corresponding to dates within the range of dates.

In one embodiment, the central controller is configured to: receive a data request from the mobile device, the data request including a crop scout location and a radius, and provide to the mobile device spatially filtered data, the spatially filtered data including only data corresponding to positions in the field separated from the crop scout location by a distance less than the radius.

In one embodiment, the central controller includes a dedicated computing device and a cloud server.

In one embodiment, each of the current scouting path and the revised scouting path includes a route and a data collection point.

In one embodiment, the central controller is configured to provide a control interface, the control interface being configured to receive input, from a control operator, for modifying a scouting path to form the revised scouting path.

In one embodiment, the interface is a graphical interface, and the input includes dragging a point on a route of the scouting path.

In one embodiment, the input further includes dragging a data collection point of the scouting path.

In one embodiment, the interface is configured to receive information about a crop scouting hazard from the control operator.

In one embodiment, the central controller is further configured to send a hazard alert, containing the information about the crop scouting hazard, to a mobile device of the plurality of mobile devices.

In one embodiment, each mobile device includes a global positioning system (GPS) receiver.

In one embodiment, the system includes a sensor configured to measure a characteristic selected from the group consisting of soil pH, soil moisture, and soil nitrogen level.

In one embodiment, the system includes a measured characteristic to a mobile device of the plurality of mobile devices.

In one embodiment, the system includes a sensor configured to measure a characteristic selected from the group consisting of air temperature, wind, and air humidity.

In one embodiment, the system includes a camera configured to take a near-infrared image and a red image, and to transmit the near-infrared image and the red image to a mobile device of the plurality of mobile devices, wherein the mobile device is configured to calculate a normalized difference vegetation index from the near-infrared image and the red image.

In one embodiment, the mobile device is configured to communicate with a piece of agricultural equipment over an International Standards Organization 11783 electrical interface.

In one embodiment, the central controller is configured to: receive a scouting report; combine data from the scouting report with weather data from a cloud weather service; generate an irrigation prescription based on the data from the scouting report and the weather data; and control an irrigation controller to irrigate the field according to the irrigation prescription.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of an agricultural situational awareness tool provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
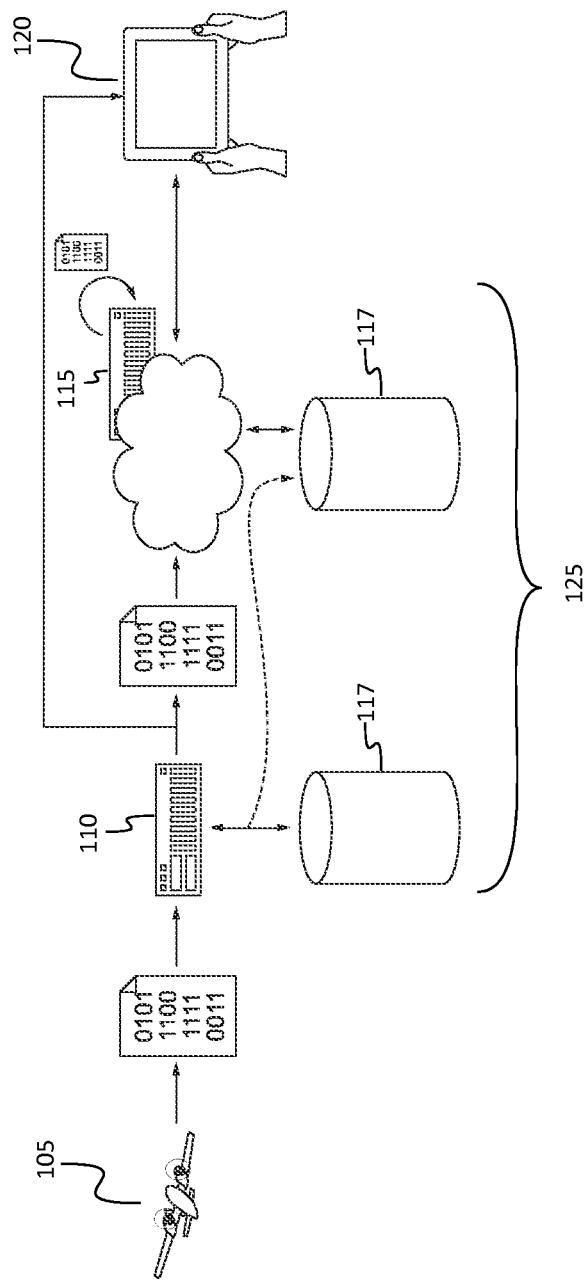
FIG. 1 is a block diagram of an agricultural situational awareness tool according to an embodiment of the present invention.

In one embodiment, an agricultural situational awareness tool includes a plurality of interconnected computing devices that may be stationary computers or mobile devices, and software running on the computers. The agricultural situational awareness tool enables a farm operator to work with a trusted advisor, with crop scouts, and with other sources of data to make tactical and strategic decisions related to the operation of a farm. Referring to FIG. 1, in one example, an aircraft 105 may gather data related to the farm, and transmit the data to an office computer 110, e.g., an Internet-connected computer in an office that is part of the farm. The office computer 110 may re-transmit the data to a cloud server 115 (e.g., a computer integrated into the system through the Internet), which may exchange data with a mobile device 120. As used herein, a cloud server may be a single computer in one location or it may be a distributed computer, including several computers, and the service provided by a cloud server may be referred to as a cloud service. The office computer 110 may also exchange data directly with the device. Each stationary computer 110, 115 may include internal or external storage 117. Each stationary computer that is part of the an agricultural situational awareness tool may be a dedicated computer, e.g., a computer owned by the farm operator, or it may be a cloud server, i.e., a computer that may be remote, that is connected to the Internet, accessed primarily through the Internet, and that need not be owned by the farm operator nor used exclusively by the farm operator. The web server may be owned, maintained, and operated by a third party, for example. Each mobile device may be a mobile phone with Internet capabilities, a tablet computer, a laptop computer, or other portable computing device.

The stationary computer or computers may form a central controller 125 (which may be geographically distributed) that coordinates scouting operations. As used herein, a "central controller" is any computer (which may be a distributed computer, i.e., it may include several computers) that is configured to coordinate scouting operations.

Crop scouts may also gather data on the farm. Each crop scout may use a mobile device 120 to gather, store, and communicate data while scouting. The mobile device may include a display, one or more input devices (e.g., a touchscreen, a microphone, and a camera), a global positioning system (GPS) receiver, interfaces (e.g. USB™ or BLUETOOTH™) for communication with external instruments or sensor (such as a thermometer or hygrometer), and one or more wireless interfaces (e.g., a cellular interface such as 3G™, 4G™ or LTE™, or an interface such as WiFi™ for wireless Ethernet or for access to a wireless local area network (WLAN)) for exchanging data with other mobile devices and stationary computers of the agricultural situational awareness tool. In areas in which cellular coverage is poor, a field base station may be deployed in the region to be scouted, e.g., with a dedicated RF or microwave link to a terminal in a location with Internet access, or with a high-gain cellular antenna, and this base station may provide Internet connectivity to the mobile devices, e.g., by providing a WLAN connection to the Internet. As used herein, two devices are connected by a "wireless data connection" when at least a portion of the data path is implemented without a wire or fiber. A mobile device is said to be connected by a wireless data connection to a stationary computer, for example, when the connection at the mobile device is a cellular data connection or a WiFi™ connection to the Internet. All communications between the computing devices of the agricultural situational awareness tool may be secure, e.g., as a result of being conducted using the hypertext transfer protocol secure (HTTPS) protocol or using Federal Information Processing Standard (FIPS)—compliant encryption.

Figure 2:
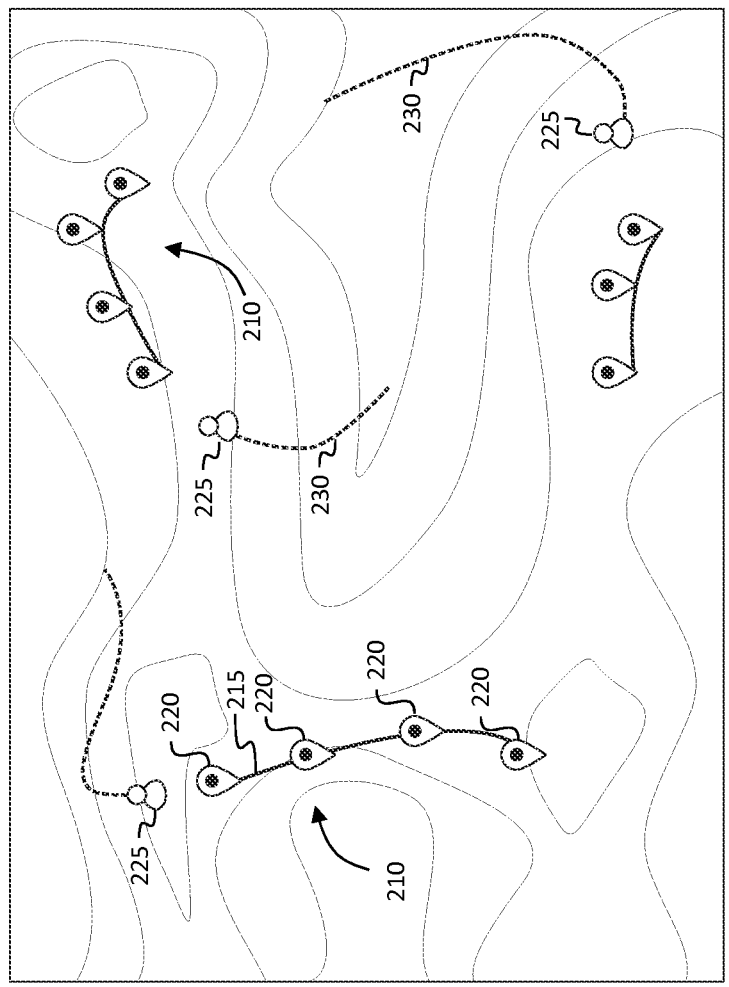
FIG. 2 is an illustration of a work plan view of a control interface according to an embodiment of the present invention.

A crop scout may walk or drive along a route 215 (FIG. 2) within the farm, stopping periodically to collect crop data or environmental data. The data may be immediately uploaded to a cloud server if an Internet connection is available; otherwise the data may be stored on the mobile device and uploaded in a batch mode when an Internet connection becomes available. Referring to FIG. 2, in one embodiment, several crop scouts may scout a farm simultaneously, with their movements coordinated by a coordinator or "control operator" referred to herein as a trusted advisor. The trusted advisor may be stationed at an office computer at the farm, or at her or his home, and may be in communication with each crop scout during the scouting operation. The trusted advisor's office computer may display a graphical user interface (GUI), such as that of FIG. 2, which may be generated by software executing on the trusted advisor's office computer, or which may be generated by software executing on a cloud server and displayed by a browser executing on the trusted advisor's office computer. In one embodiment the trusted advisor;s computer is a mobile device that displays the trusted advisor GUI (or "control GUI" or "control interface") in a web browser executing on the trusted advisor's mobile device. The background of the image displayed by the control interface (or the crop scouting interface, discussed below) may be an aerial image of the farm or a portion of the farm, a map of the farm, or a contour plot (as illustrated in FIG. 2) or color-coded plot of a characteristic of the farm, such as a measure of plant health or expected crop yield per plant.

The trusted advisor may create a work plan at the beginning of the scouting operation, and may modify the work plan during the scouting operation. The work plan may include a scouting path 210 for each crop scout. Each scouting path may include a route 215, which may be defined by a series of closely-spaced waypoints. The scouting path may also include data collection points 220, at which the crop scout stops to obtain data. The control interface may display the scouting paths 210 as well as the current position 225 and recent path 230 of each crop scout. Each crop scout may begin the scouting operation with an initial scouting path, created by the trusted advisor. The trusted advisor user interface may display the progress of each crop scout along a respective scouting path in real time, based on GPS position data transmitted by the crop scout's mobile device to the trusted advisor's computer. The trusted advisor may modify any of the scouting paths during the scouting operation. For example, with the user interface of FIG. 2, the trusted advisor may drag a point on a scouting path to a new location to change the scouting path; the user interface may then form a modified scouting path passing through the new location, e.g., using a spline or by routing the path along a path suitable for travel, e.g., between rows of crops or along access roads. The agricultural situational awareness tool may then transmit the modified scouting path to the affected scout, who will begin to follow the new scouting path.

Figure 3:
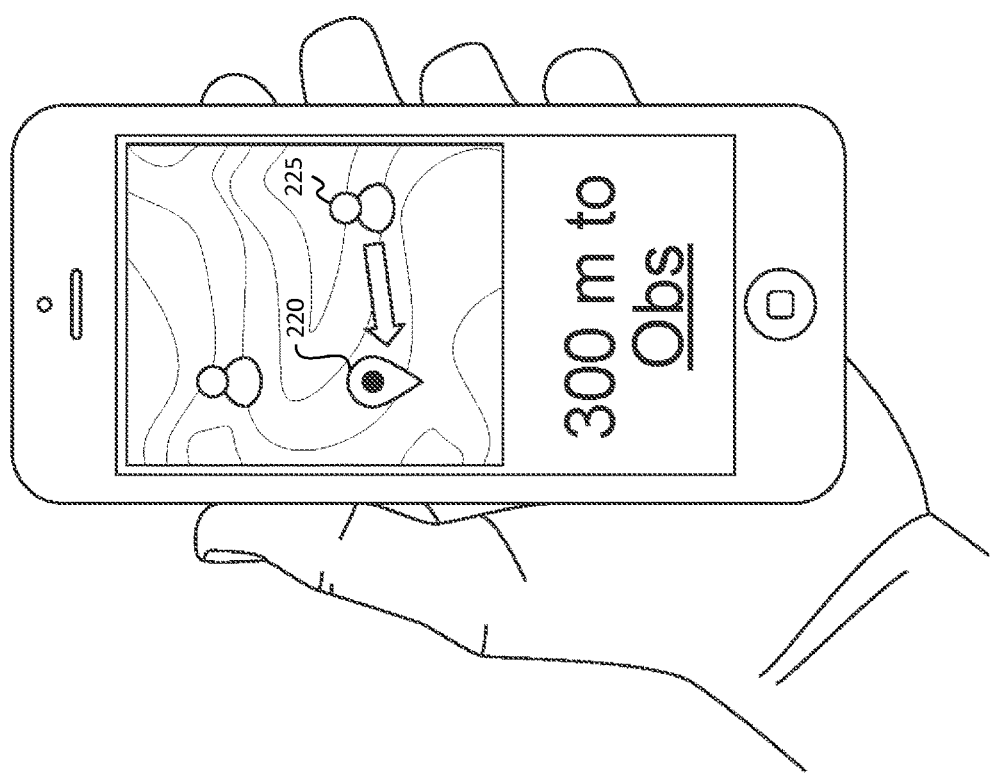
FIG. 3 is an illustration of a navigation view of a crop scouting interface according to an embodiment of the present invention.

Referring to FIG. 3, the crop scout's mobile device may have a crop scouting interface (e.g., a GUI) that may display a map showing the crop scout's current location 225, the scouting path, and the next data collection point 220. When travelling from one data collection point 220 to the next, the crop scout may use this display to navigate. At each data collection point 220, the scout may gather crop data and environmental data. Data may be gathered and communicated in various formats including text descriptions, audio files (e.g., of dictated descriptions), photographs and video (e.g., of plants or pests), and special format data, such as binary data generated by a particular sensor or instrument. Metadata may also be reported along with crop data and environmental data; metadata may include, for example, the time and position of an observation or measurement. Crop data may include data on the anticipated yield and on the health of the crop. In a corn field, for example, the crop scout may count, for a number of corn plants in a row, the number of ears of corn per plant, and he or she may shuck one or more ears of corn and count, or estimate, the number of kernels on each ear. The number of kernels may be estimated, for example, by measuring the area of the kernel-bearing portion of the ear, and dividing the area by the product of (i) the kernel spacing in the longitudinal direction and (ii) the kernel spacing in the circumferential direction. The area of the kernel-bearing portion of the ear may be estimated as the product of (i) the circumference at a midpoint along the length of the ear, and (ii) the length of the kernel-bearing portion of the ear. The kernel spacing (in the longitudinal direction or in the circumferential direction) may be estimated by counting a number of kernels and measuring the distance between the first and the last; for example, if the distance between a first kernel and an eleventh kernel is 2.5 inches, then the kernel separation is about 0.25 inches. In one embodiment, the crop scout takes a photograph of a shucked ear of corn and a machine-vision process, running in the mobile device or on a cloud server, estimates the number of kernels on the ear. The data the crop scout collects, and notes of observations the crop scout makes, during the scouting operation, may become part of a scouting report generated by each crop scout during the scouting operation. The scouting report may include text, photographs, audio and video, and special format (e.g., binary) data, and it may be compressed, transmitted to another computing device of the agricultural situational awareness tool, and decompressed for review or analysis. For example, one crop scout may send her or his scouting report to another crop scout for the purpose of seeking advice regarding certain observations, photographs, or other data in the scouting report.

The crop scout may also obtain data on the health of plants near the data collection point 220. For example, the crop scout may check for symptoms of disease (e.g., fungus) or pests, such as browning or yellowing of leaves, or leaves from which portions are missing. If the crop scout notes such symptoms she or he may report the symptoms (e.g., with a description, or by providing a photograph of an affected plant) or she or he may report a diagnosis, or both. The crop scout may interpret physical injury to a plant as an indication that wildlife (e.g., deer) have intruded into the farm. The crop scout may measure the height of a plant, and the circumference of its stem. The crop scout may also take photographs of the plants with a suitable camera, and the normalized difference vegetation index (NDVI) of the plants may be used to assess their health. As used herein, NDVI is defined as the ratio of (i) the difference between the near infrared reflectivity (NIRR) of a plant and the red reflectivity (RR) to (ii) the sum of the near infrared reflectivity of the plant and the red reflectivity of the plant, i.e., NDVI= (NIRR−RR)/(NIRR+RR). NDVI data may also be obtained from suitable images obtained by aircraft or satellite. The crop scout may also obtain thermal images of a plant, from which the temperature of the plant, and indications of plant health, may be inferred. Environmental data gathered at the data collection point 220 may include air humidity and temperature, wind, soil moisture, soil pH, soil nitrogen level, and the presence of pests, such as insects or birds.

Data collection may be performed by various methods. For example the crop scout may make observations and record them by keying them into the mobile device, or dictating them into the mobile device. Dictated observations may be stored and transmitted as audio files or voice recognition may be used to convert them to text. The crop scout may take photographs with a camera integrated into the mobile device or with a separate camera (e.g., a camera with a near infrared imaging capability). The crop scout may operate separate instruments such as a soil pH, soil nitrogen level, or soil moisture test instrument, which may display measurement results to the crop scout for entry into the mobile device or which may transmit measurement results directly to the mobile device though, e.g., a USB™ or BLUETOOTH™ connection.

The cloud server may obtain various data from an archive of data compiled for the farm, or from other sources, such as a cloud weather service, or networked weather stations on the farm providing micro climate data. The data for the farm may include data from previous scouting operations, and various other data, including data from aerial surveys, records of past watering prescriptions, fertilizer prescriptions, and pesticide prescriptions, records of previous harvest yields, and the like.

Figure 4:
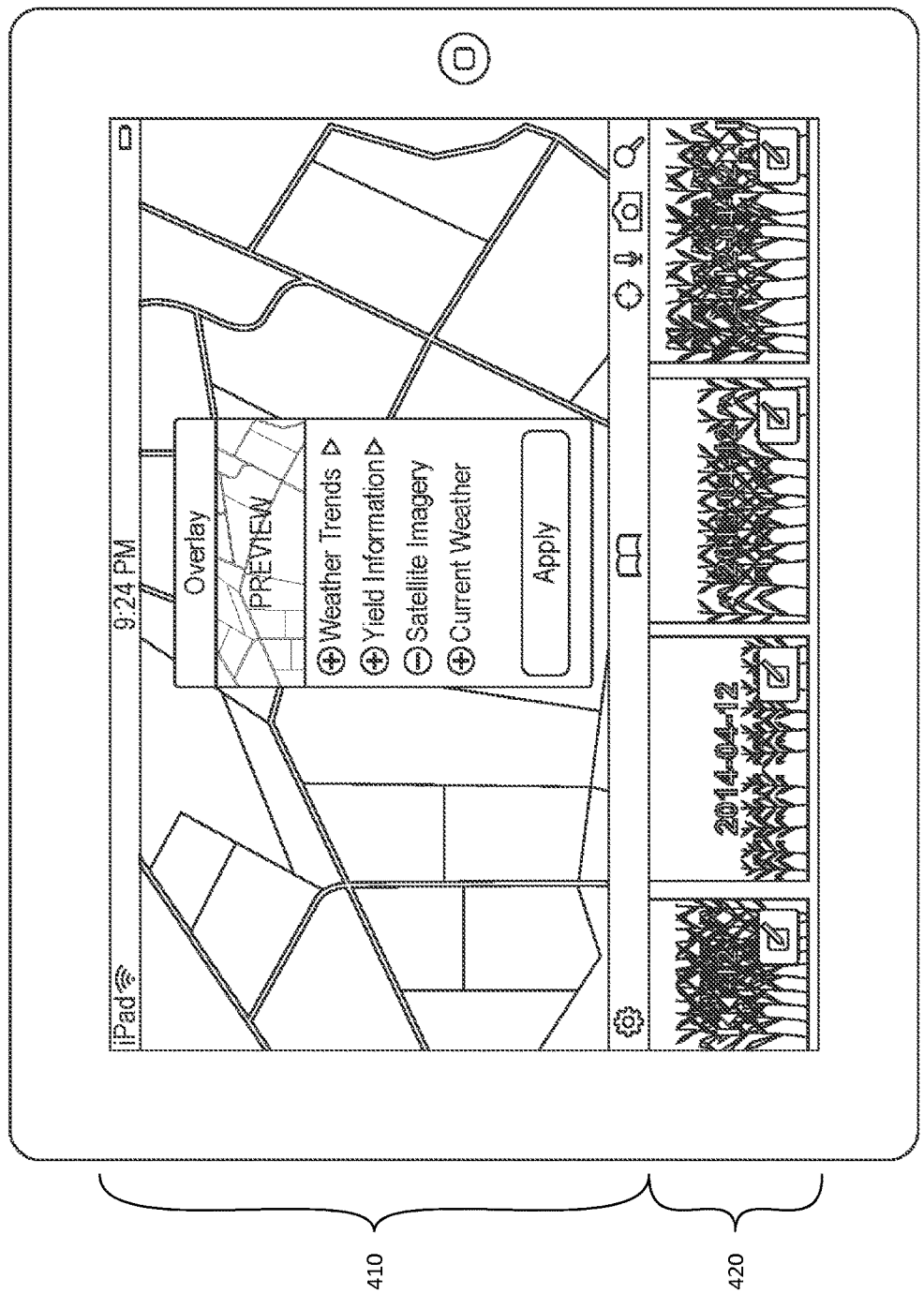
FIG. 4 is an illustration of a map and report view of the control interface according to an embodiment of the present invention.

Referring to FIG. 4, the control interface may, in one view, display, in an upper portion 410, an aerial view or map of the farm, with one or more data layers superimposed. The trusted advisor may be able to select from a displayed menu which of the data layers are to be displayed, as well as whether the map or aerial image is to be displayed. A lower portion 420 of the view may display crop photographs from various points on the farm. In some embodiments the mobile device is an iPAD™ as illustrated in FIG. 4; in other embodiments it is a different kind of mobile device.

Figure 5:
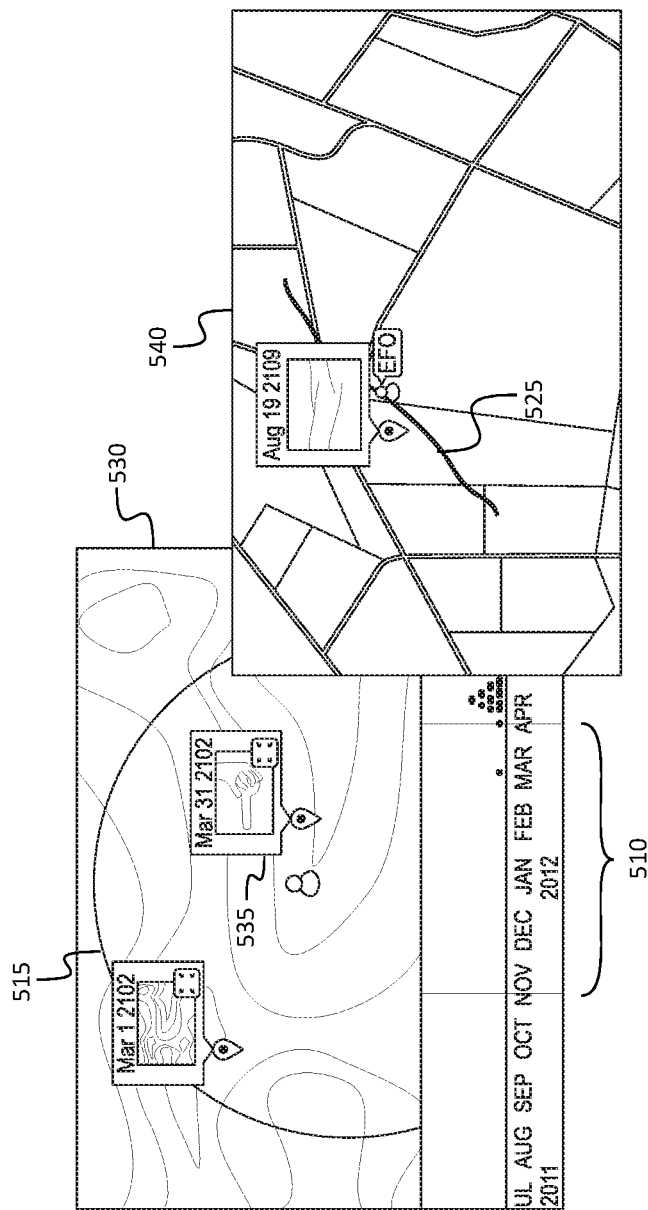
FIG. 5 is an illustration of a filtered data view of two layers of a crop scouting interface according to an embodiment of the present invention.

Referring to FIG. 5, during the scouting operation, the crop scout may request, via the crop scout's mobile device, relevant data from another computing device in the agricultural situational awareness tool. For example, the crop scout may request, from a cloud server, historical weather data, historical crop type, historical crop yield, soil type, soil compaction, and irrigation data. The crop scout may use historical precipitation data, or a soil moisture prediction, or both, for comparison with a soil moisture measurement the crop scout may have made. The availability of such data may enable the crop scout to investigate any unexpected measurements immediately. For example, if the soil is drier or moister than expected, the crop scout may test the irrigation system to see whether a malfunction in the irrigation system is responsible for the unexpected result. When requesting historical data, the crop scout may request the data for only a range 510 of historical dates (e.g., for the past 5 months) and for only a particular area (e.g., a circular region 515 defined by a certain radius from the crop scout's current location). The cloud server may then filter the available data (i.e., with a temporal filter and a spatial filter) and send only data falling within the temporal range and area specified; this may reduce data transfer loads. Data for the farm may be represented as layers, and graphically rendered on the mobile device's display, optionally combined with other layers and overlaid on a map or image of the farm. For example, the crop scout may request a layer indicating where on the farm hail fell during a recent storm, if the crop scout observes physical damage that appears to have been caused by hail. Such data may originally have been obtained by a weather radar system covering the area of the farm. As another example, illustrated in FIG. 5, a first layer 530 may include an aerial image of the farm with contour lines and with inset images such as a photograph 535 of an ear of corn, obtained by the crop scout, and with a calendar display in a lower frame showing the range of dates 510 selected by the crop scout. This layer may also show the circular region 515 used by the filter. A second layer 540 may include a map of the farm with e.g., weather information including the path 525 of a tornado (that occurred within the range 510 of dates). In FIG. 5 the two layers 530, 540 are shown offset from each other for clarity; in operation they may be displayed superimposed, without an offset, by the control interface.

The crop scout may also request and receive other data for comparison with current observations via connectivity to the cloud through wireless data connection. This may allow the application (or "app") running on the mobile device to remain lightweight, pulling down data on demand, although caching may also be supported. For example, the crop scout may request, and receive from a cloud server, a prediction of the number of kernels of corn per ear, and compare it to her or his observations, and, if there is a discrepancy, perform further observations to identify the cause. In another example the crop scout may observe that the nitrogen level (as measured by a soil tester) is unexpectedly low, and load a fertilization layer to see when, within the past year, nitrogen-containing fertilizer was applied. If the crop scout discovers that the area has not been fertilized for an unusually long time, she or he may note this observation in the scouting report, for further investigation by the trusted advisor or the farm operator.

The trusted advisor may also participate in the process used when an unexpected observation is made. For example, if the crop scout reports degraded plant health at a data collection point 220 (e.g., plant health that is significantly inferior to the plant health observed in the same location on a recent scouting operation), the trusted advisor may create a number of additional nearby data collection points 220 in the crop scout's scouting path, for the crop scout to visit during the scouting operation. This may allow the trusted advisor or the crop scout to assess the extent of the problem, which may provide an indication of the cause. Each crop scout may also communicate with other crop scouts. For example a crop scout may report degraded plant health, and other nearby crop scouts may report whether they are observing similarly degraded plant health, allowing the team of crop scouts to make a real-time assessment of the extent of the problem.

In one embodiment, a mobile device of the agricultural situational awareness tool may be used to communicate with various pieces of equipment employed on the farm, such as tractors, harvesters, planters, and sprayers. The mobile device may interface with such a piece of equipment over an International Standards Organization 11783 (ISOBUS) interface using a suitable adapter, and collect data from the equipment, such as fuel consumption data, fault codes, and information on upcoming maintenance.

Figure 6:
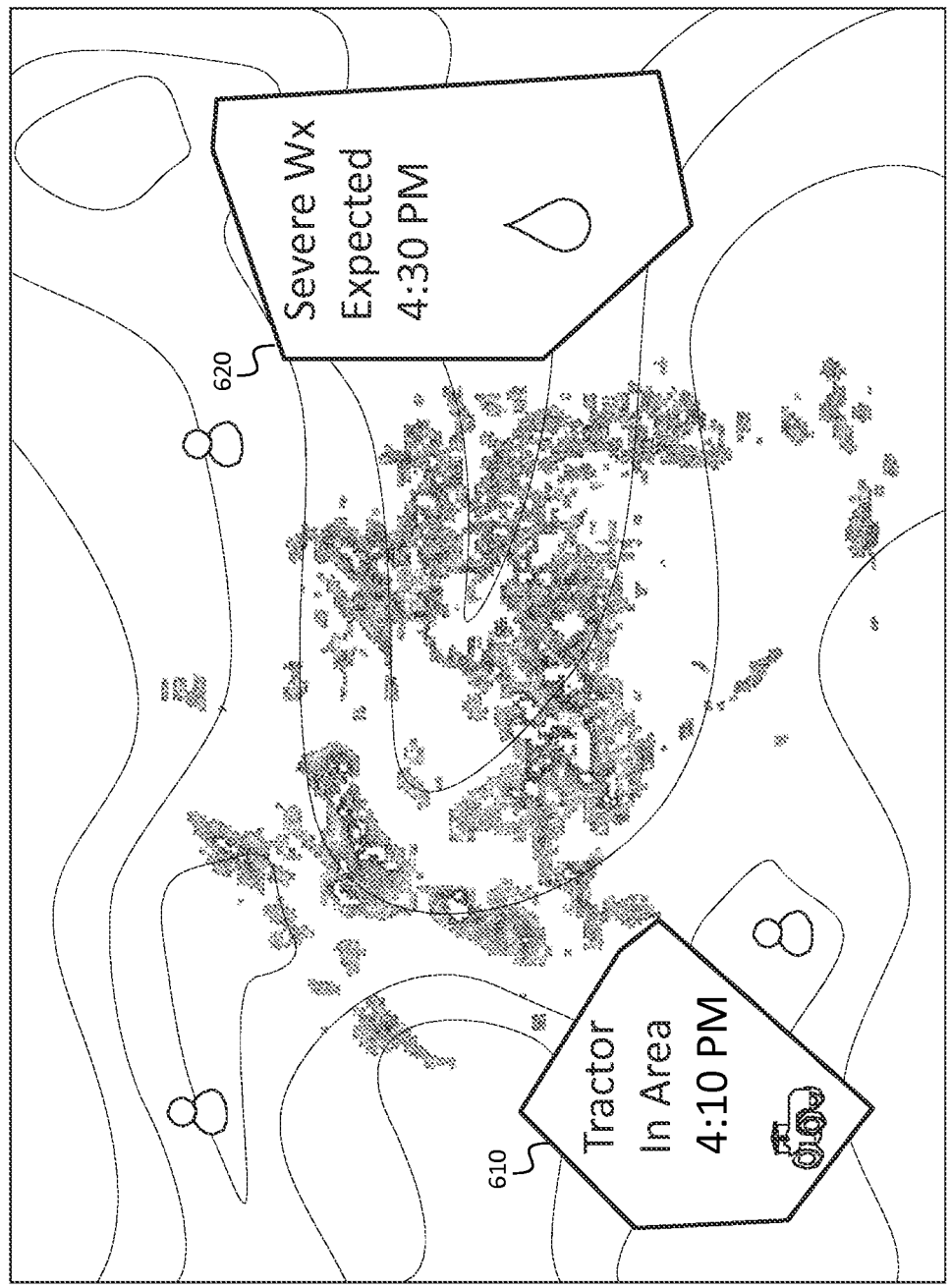
FIG. 6 is an illustration of a hazards summary view of a control interface according to an embodiment of the present invention.
Figure 7:
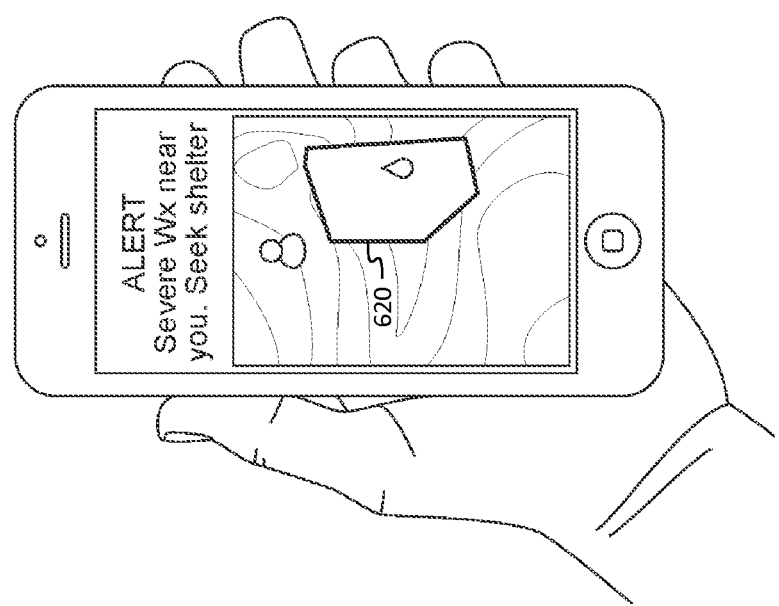
FIG. 7 is an illustration of a hazard alert view of a crop scouting interface according to an embodiment of the present invention.

Referring to FIG. 6, in one embodiment the trusted advisor sends alerts to the crop scouts using the agricultural situational awareness tool. The alerts may for example warn the crop scouts of tractor operations, in a first area 610, that may pose a hazard to the crop scouts (e.g., operations that were not planned when the work plan was generated), or of severe weather in a second area 620. The trusted advisor's GUI, in one embodiment, is shown in FIG. 6. The trusted advisor may draw (or import, from a suitable data source) the boundaries for the areas of concern, and enter text describing the hazard. The display of a crop scout in the vicinity of the severe weather warning area of FIG. 6 is shown in FIG. 7; the crop scout's display shows the crop scout's location and the area of concern, overlaid on a map or aerial photograph, of the farm, or on a set of contours, as illustrated.

After the completion of a scouting operation (or during the scouting operation) the data gathered may be compiled and analyzed by the cloud server for the use of the farm operator. In this process the cloud server may combine the data from the scouting operation with data from various other sources as described above, e.g., other cloud services, and historical data of various kinds for the farm. The farm operator may then make various decisions based on combinations of the data from the scouting operation and other data. For example the farm operator may create or modify irrigation prescriptions, fertilizer prescriptions, and pesticide prescriptions based on the data from the scouting operation, together with, for example, weather forecast data, which the cloud server may obtain from another cloud service and merge with the data from the scouting operation. For example, the cloud server may calculate the amount of water needed during the coming week, given the current soil moisture and expected temperatures and humidity, to keep the soil moisture within an acceptable range. The cloud server may then compare the amount of water needed to the amount of water expected from precipitation during the coming week, and recommend, to the farm operator, an irrigation prescription that compensates for any deficit. In one embodiment, the cloud server is in direct communication with an irrigation controller on the farm, and sets irrigation prescriptions automatically, subject to override by the farm operator. Similarly the cloud server may make recommendations regarding, or directly control, pesticide and fertilizer prescriptions, based on data received from the scouting report and from other sources. Such data may include the type of crop, the maturity of the crop, current soil conditions such as pH and nitrogen levels, extent and severity of any pest infestations, soil moisture, historical weather, predicted weather, and historical pesticide and fertilizer prescriptions.

The agricultural situational awareness tool may also assist the farm operator in making other decisions. For example the cloud server may provide integrated data on futures prices, weather, and availability of silo storage and transportation, to allow the farm operator to schedule harvesting when the weather is expected to be suitable, transportation and storage is available, and prices are favorable. The agricultural situational awareness tool may further provide other services or features to the farm operator, such as paperless real time invoicing and reports to clients, fleet and personnel management, control of autonomous crop survey via an unmanned aerial vehicle (UAV) equipped with sensors, and integration of data from such a survey. The agricultural situational awareness tool may also plan image collection and provide route planning for a crop survey using a camera mounted on a Common Ground Control System (CGCS) controlled vertical takeoff and landing (VTOL) aircraft.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

Although limited embodiments of an agricultural situational awareness tool have been specifically described and illustrated herein, many modifications and variations will be apparent to those skilled in the art. Accordingly, it is to be understood that an agricultural situational awareness tool employed according to principles of this invention may be embodied other than as specifically described herein. The invention is also defined in the following claims, and equivalents thereof.

What is claimed is:

1. A system for collecting crop data and environmental data from a field, the system comprising:
    a plurality of mobile devices configured to be deployed to the field; and
    a central controller;
    the mobile devices being configured to be connected to each other and to the central controller, while in the field, by wireless data connections;
    each mobile device being configured:
        to display a current device location;
        to store and display a current scouting path, the current scouting path comprising a series of waypoints and a plurality of data collection points, the displaying comprising displaying the series of waypoints as a continuous route on a map;
        to receive, in the field, from the central controller, a revised scouting path, the revised scouting path comprising a series of waypoints and a plurality of data collection points, and to substitute the revised scouting path for the stored current scouting path; and
        to receive, while in the field, input including current crop data or current environmental data, and to send, while in the field, to the central controller, the current crop data or current environmental data
    wherein the central controller is configured to:
        receive a data request from the mobile device, the data request including a crop scout location and a radius, and
        provide to the mobile device spatially filtered data, the spatially filtered data including only data corresponding to positions in the field in a circular region defined by the radius and centered at the crop scout location, and
    wherein the mobile device is further configured to display, overlaid on a map or image, a circle representing the circular region;
    wherein the system further comprises a sensor configured to measure soil pH, a sensor configured to measure soil nitrogen level, and
a field base station with a high-gain cellular antenna, the field base station being configured to provide Internet connectivity to the mobile devices using Federal Information Processing Standard—compliant encryption,
wherein a first mobile device of the plurality of mobile devices is further configured:
    to determine whether an Internet connection is available, and
    in response to determining that an Internet connection is not available, to:
        store crop data and environmental data on the mobile device, and
        upload the crop data and environmental data in a batch mode when an Internet connection becomes available,
wherein the central controller is geographically distributed, and is further configured to:
    calculate an amount of water needed during a coming week based on:
        soil moisture data received from the first mobile device,
        expected temperatures, and
        expected humidity,
    set an irrigation schedule based on the calculation, the schedule being subject to override by a farm operator,
    control a pesticide prescription based on data received from the first mobile device, and
    control a fertilizer prescription based on data received from the first mobile device.

2. The system of claim 1, wherein the central controller is configured to provide to a mobile device of the plurality of mobile devices, upon request from the mobile device, while the mobile device is in the field, historical crop data or environmental data.

3. The system of claim 2, wherein the central controller is configured to: receive a data request from the mobile device, the data request including a range of dates, and provide to the mobile device temporally filtered data, the temporally filtered data including only data corresponding to dates within the range of dates.

4. The system of claim 1, wherein the central controller comprises a dedicated computing device and a cloud server.

5. The system of claim 1, wherein each of the current scouting path and the revised scouting path comprises a route and a data collection point.

6. The system of claim 1, wherein the central controller is configured to provide a control interface, the control interface being configured to receive input, from a control operator, for modifying a scouting path to form the revised scouting path.

7. The system of claim 6, wherein the control interface is configured to receive information about a crop scouting hazard from the control operator.

8. The system of claim 7, wherein the central controller is further configured to send a hazard alert, containing the information about the crop scouting hazard, to a mobile device of the plurality of mobile devices.

9. The system of claim 6, wherein the control interface is a graphical interface, and the input comprises dragging a point on a route of the scouting path.

10. The system of claim 9 wherein the input further comprises dragging a data collection point of the scouting path.

11. The system of claim 1, wherein each mobile device includes a global positioning system (GPS) receiver.

12. The system of claim 1, further comprising a sensor configured to transmit data including a measured characteristic to a mobile device of the plurality of mobile devices.

13. The system of claim 1, further comprising a sensor configured to measure a characteristic selected from the group consisting of air temperature, wind, and air humidity.

14. The system of claim 1, further comprising a camera configured to take a near-infrared image and a red image, and to transmit the near-infrared image and the red image to a mobile device of the plurality of mobile devices, wherein the mobile device is configured to calculate a normalized difference vegetation index from the near-infrared image and the red image.

15. The system of claim 1, wherein the mobile device is configured to communicate with a piece of agricultural equipment over an International Standards Organization 11783 electrical interface.

16. The system of claim 1, wherein the central controller is configured to: receive a scouting report; combine data from the scouting report with weather data from a cloud weather service; generate an irrigation prescription based on the data from the scouting report and the weather data; and control an irrigation controller to irrigate the field according to the irrigation prescription.

17. The system of claim 1, wherein each mobile device is configured: to send the current crop data or current environmental data immediately, when an Internet connection is available.

* * * * *